United States Patent
Kenet et al.

[11] Patent Number: 5,291,889
[45] Date of Patent: Mar. 8, 1994

[54] APPARATUS AND METHOD FOR SPATIALLY POSITIONING IMAGES

[75] Inventors: Robert O. Kenet, Lakeland, Fla.; Guillermo J. Tearney, Boston, Mass.

[73] Assignee: Vanguard Imaging Ltd., Cambridge, Mass.

[21] Appl. No.: 704,464

[22] Filed: May 23, 1991

[51] Int. Cl.$^5$ ............................................. A61B 5/00
[52] U.S. Cl. ................................... 128/653.1; 128/665; 364/413.13
[58] Field of Search ................. 128/653.1, 665, 653.2, 128/662.05, 662.06, 660.07, 916; 364/413.13, 413.14, 413.19, 413.22

[56] References Cited

U.S. PATENT DOCUMENTS

| | | |
|---|---|---|
| 4,710,876 | 12/1987 | Cline et al. ............... 128/653.1 |
| 4,729,098 | 3/1988 | Cline et al. ............... 128/653.1 |
| 4,922,909 | 5/1990 | Little et al. ............... 128/630 |
| 4,945,478 | 7/1990 | Merickel et al. ........... 364/413.22 |
| 5,027,817 | 7/1991 | John ......................... 128/653.1 |
| 5,086,392 | 2/1992 | Nakajima ................... 364/413.22 |
| 5,099,846 | 3/1992 | Hardy ....................... 128/653.1 |
| 5,113,357 | 5/1992 | Johnson et al. ............ 364/413.22 |
| 5,161,536 | 11/1992 | Vilkomerson et al. ...... 128/660.07 |
| 5,181,513 | 1/1993 | Touboul et al. ............ 128/660.07 |

Primary Examiner—Lee S. Cohen
Assistant Examiner—Krista M. Pfaffle
Attorney, Agent, or Firm—Joseph S. Iandiorio

[57] ABSTRACT

An apparatus and method for facilitating the positioning of a live image with respect to a reference image in which the live and reference images are combined to produce a composite image that is displayed.

38 Claims, 1 Drawing Sheet

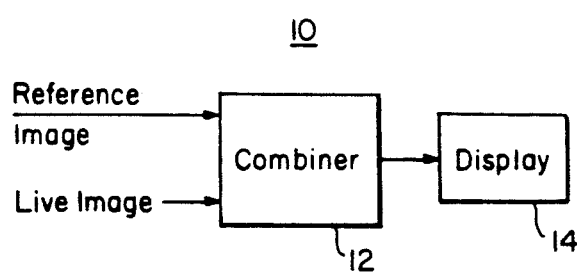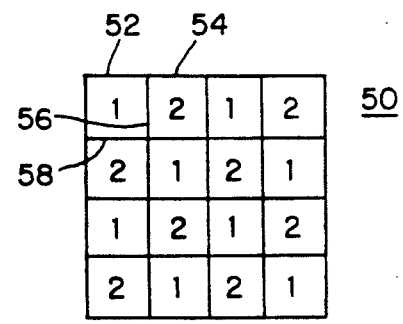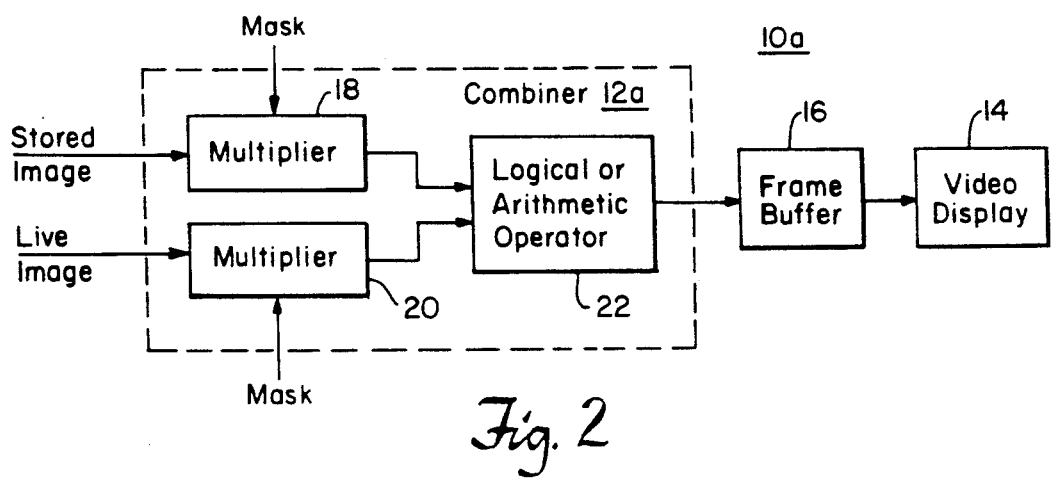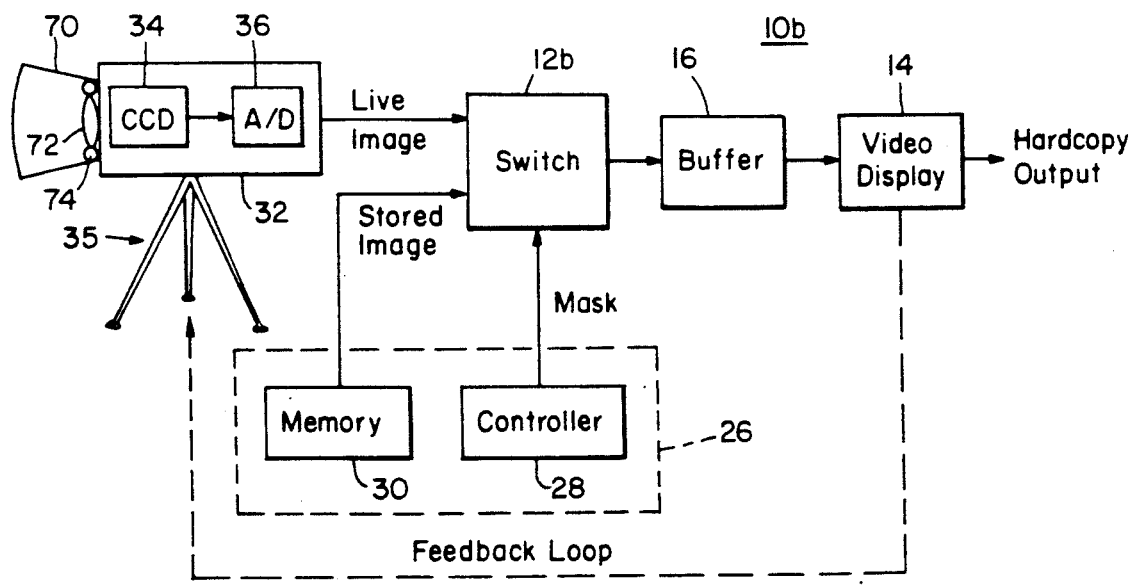

APPARATUS AND METHOD FOR SPATIALLY POSITIONING IMAGES

FIELD OF INVENTION

This invention relates to an apparatus and method for positioning two images which is particularly adapted for positioning a live image of a body surface in relation to a stored image of the same body surface to allow temporal comparison for diagnostic purposes.

BACKGROUND OF INVENTION

There are many situations in which it is desirable to provide for temporal comparison of images. In the field of medicine, it can be critical for proper diagnosis to have the ability to view a portion of the surface of the human body over time. Historically, this has been done by the use of physician's notes regarding previous examination of the area in question, in comparison to the present-time observation of that area. However, such methods require an inordinate amount of the physician's time, and often at best provide only a rough comparison that may be insufficient for diagnosing certain conditions such as melanoma.

Physicians have also used photography to aid in this temporal comparison. The physician may compare photographs of the body portion taken at different times, or compare photographs directly to the portion of the body surface. However, these methods at best provide juxtaposition of images that requires the physician to use judgment in detecting sometimes subtle changes to the body surface. In one attempt to produce juxtaposed images which are at least oriented in a similar manner to simplify this comparison, there has been used a system that displays on a CRT a previously-taken image next to a live video image. The physician may then rotate the video camera until the live image is perceived to be in the same orientation as the stored image. This method, however, still requires the physician to estimate by eye subtle changes in the surface area that may be indicative of serious disease.

Another area where temporal comparison of images is important is in the testing of cutaneous pharmaceuticals and cosmetics. Before and after photographs of regions of skin are often used to document the benefits of a treatment. A method of aligning images, particularly with a means for controlling and standardizing lighting conditions, would provide more reliable before and after photographs where changes in the images could more reliably be related to the treatment rather than the image acquisition conditions including camera alignment and lighting changes.

SUMMARY OF INVENTION

It is therefore an object of this invention to provide an apparatus and method for facilitating the positioning of a live image with respect to a reference image that allows extremely precise image alignment.

It is a further object of this invention to provide such an apparatus and method that requires very little judgment to accomplish such precise alignment.

It is a further object of this invention to provide such an apparatus and method that allows reproducible temporal imaging of body surfaces.

It is a further object of this invention to provide such an apparatus and method that allows reproducible temporal imaging of complicated structures to allow exact temporal comparison.

It is a further object of this invention to provide an apparatus and method that facilitates standardization of lighting conditions for imaging regions of a body surface.

This invention results from the realization that temporal comparison of images of body surfaces may be accomplished by intermingling the live and reference images, and displaying the intermingled image.

This invention consists essentially of a method and apparatus of facilitating the positioning of a live image, which may be an image of a body surface, with respect to a reference image, typically of the same structure or body surface, in which the live and reference images are combined to produce a composite image, and the composite image is displayed. The combination may be accomplished by superimposing or intermingling the images. In one embodiment, portions of the images are juxtaposed alternately on the display, preferably providing an intermingled composite image in a checkerboard pattern having rectangular image areas.

The reference image to which the live image is compared may be a stored image. Portions of the reference image may be displayed before displaying the composite image to facilitate alignment. In one embodiment, the images are derived from digital images. In that case, the digital images may be combined in some manner to make the composite image. The combination of the digital images may be linear or nonlinear, and may be accomplished pixel by pixel, to provide a desired composite image. For example, the composite image pixels may be chosen alternately from the stored and live image to create an intermingled image having a desired pattern such as a checkerboard pattern of rectangles, a honeycomb pattern of hexagons, or other tesselation or mosaic of alternating regions of particular geometric shapes. The image signal combination may be stochastic or deterministic. Another example would be an algebraic linear combination of the two images such as a pixel-by-pixel multiplication of each image by a scalar value followed by a pixel-by-pixel addition of the two images. This could result in a see-through version of one image superimposed on the other.

DISCLOSURE OF PREFERRED EMBODIMENT

Other objects, features and advantages will occur to those skilled in the art from the following description of a preferred embodiment and the accompanying drawings, in which:

FIG. 1 is a block diagram of a system for facilitating alignment of a live image with respect to a reference image according to this invention;

FIG. 2 is a more detailed block diagram of an embodiment of the system of FIG. 1;

FIG. 3 is a block diagram of an alternative embodiment of the system of FIG. 1; and FIG. 4 is a representation of an intermingled composite image provided by this invention.

There is shown in FIG. 1 apparatus 10 according to this invention which is also suitable for performing the method of this invention. Apparatus 10 includes image combiner 12 that combines a live image and a reference image to produce a composite image, which is displayed on display 14. The reference and live images may comprise analog or digital signals. For temporal comparison of images of body surfaces, the reference image is preferably a stored digital image and the live image a digitized video image. Combiner 12 may then combine the two digital image signals either linearly or nonlinearly as desired to produce a digital composite image signal that may then be displayed on display 14.

One embodiment of system 10a of this invention is shown in FIG. 2. Combiner 12a includes multipliers 18 and 20 for multiplying the stored and live image, respectively, by a mask function that may be stochastic or deterministic. For example, the mask functions could allow a pixel by pixel choice of the composite image signal from either the stored image or the live image by in effect multiplying the images by either one or zero as appropriate. Such selection could be accomplished with a stochastic function that causes a random, or pseudorandom, selection of a percentage of the displayed pixels from one of the stored image and live image, and the selection of the balance of the pixels from the other of the stored and live image. Preferably, the masking functions are chosen to juxtapose portions of the two images in the display. For example, the images may be intermingled by alternately selecting portions of the stored and live images in patterns such as the checkerboard pattern with rectangular images shown in FIG. 4 and described below.

Combiner 12a consists of two main parts: (1) a multiplier, which multiplies each image by its respective "mask" function, and (2) a combiner that performs a combining function, taking two images as its input and outputting a single image.

Each mask function may be a two-dimensional array of numbers, with one number for each pixel in the associated image. The values of each of these numbers could be ones and zeros (i.e., a binary mask) or could be scalar numbers such as fractions between zero and one. The values of the mask functions may be chosen deterministically to represent a predetermined geometric pattern (e.g., a plane-filling tesselation), or they may be chosen stochastically by a random, or pseudorandom, function (e.g., a spatial white noise pattern).

The combining function may be a logical operation, such a pixel-by-pixel LOGICAL OR function, or LOGICAL AND function. Alternatively, the combining function may be a function which performs a simple pixel-by-pixel linear arithmetic operation such as ADDITION or a nonlinear operation such as MULTIPLICATION.

Particular mask functions and combining functions can be used to generate a number of types of combined, intermingled, and/or superimposed images. Two types which may be of particular utility are those which result in (1) alternative, juxtaposed, geometric segments of the two images (i.e., a plane-filling tesselation), such a checkerboard pattern of rectangles, or squares, or a honeycomb pattern of hexagons, and (2) a linear combination of the two images, such as 0.25 times the references image plus 0.75 times the live image.

For color output, the stored and live images may each comprise RGB signals, for example three, 8-bit signals representing the RGB values of each pixel. In that case, combiner 12a may accomplish a combination in which the output pixel signals are combined 24-bit signals, with each of the three 8-bit RGB signals chosen as a desired combination of the respective 8-bit signals of the two input signals. Color manipulation or enhancement may be accomplished as desired in making such combination in order to provide a desired output.

Another embodiment of a system 10b for accomplishing this invention is shown in FIG. 3. For temporal comparison of images of body surfaces, for example for photographic documentation of clinical trials of cutaneous pharmaceuticals, or documentation of skin lesions such as moles for diagnostic purposes, the live image of the body surface may be taken with video camera 32 mounted on tripod, arm, support, or other adjusting device 35 to allow manual or automatic adjustment of the camera position to accomplish the objective of aligning the live image with a stored image. Alternatively, camera 32 could be hand held with a positioning annulus, cone, or other support 70, mounted on lens 72, which gently rests on the surface to be imaged to block ambient light and provide standardization of light from ring light source 74. Camera 32 includes one or more image transducers, e.g., CCDs, 34 whose outputs are digitized by one or more analog to digital converters 36 for supplying either a black and white, color, or multispectral digital image signal to switch 12b. A previously captured image of the same body region is digitized and stored in memory 30 of computer 26 and also applied to switch 12b. Controller 28 controls the operation of switch 12b to select, on a pixel by pixel basis if desired, the display of either the live image or the stored image. The composite video signal is then buffered in frame buffer 16 and displayed on display 14. The operator may use the display to correctly position the camera.

For use in temporal studies of complex surface features such as skin wrinkles, it is important that the stored and live images be exactly aligned to ensure that exactly the same skin region is being photographed to provide an accurate comparison. One manner in which such complex images may be aligned is by selecting a masking function applied to switch 12b by controller 28 to accomplish a checkerboard output such as that shown in FIG. 4, in which alternate rectangular areas such as areas 52 and 54 are selected from one of the two images, labelled one and two. To accomplish such an output in which portions of the two images are alternately juxtaposed, preferably in rectangular blocks in a number of alternating rows of blocks as shown in FIG. 4, the mask function controlling the operation of switch 12b may be a two dimensional matrix of ones and zeroes of the same dimension as the live and stored images to accomplish the selection of each pixel of the output signal from one of the two input image signals. Such a geometric pattern of alternating image areas creates discontinuities in the observed output along the borders between the image areas such as borders 56 and 58. These spatial discontinuities are strong stimuli to the human visual system. When images 1 and 2 come into alignment, the spacial discontinuities suddenly disappear across a large number of horizontal and vertical image area borders such as borders 56, and 58; the perceived dramatic effect facilitates exact alignment of the images by a human operator.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of facilitating the positioning of a live image of a body surface with respect to a reference image of the same body surface, comprising:
   obtaining the live image;
   obtaining the reference image;

intermingling the live and reference images to produce a composite image including alternately juxtaposing image portions of said live and reference images in a tesselation; and displaying said composite image.

2. The method of claim 1 in which the reference image includes the same body surface as the live image to facilitate positioning of temporally related images.

3. The method of claim 1 further including storing the reference image.

4. The method of claim 1 further including digitizing at least one of the images.

5. The method of claim 4 in which said intermingling of images is deterministic.

6. The method of claim 4 in which said intermingling of images is linear.

7. The method of claim 4 in which said intermingling of images is non-linear.

8. The method of claim 4 in which each image is composed of a plurality of pixels.

9. The method of claim 8 in which combining the images includes combining the pixels from said images to produce composite pixels.

10. The method of claim 9 in which each composite pixel is taken from only one of the digital images.

11. The method of claim 4 in which said intermingling of images is stochastic.

12. The method of claim 1 further including displaying portions of the reference image before displaying the composite image.

13. The method of claim 1 in which said tesselation comprises polygonal image areas.

14. A method of facilitating the positioning of a live image with respect to a reference image, comprising:
obtaining the live image;
obtaining and storing the reference image;
alternately selecting geometrically-shaped portions of the two images to produce a composite image comprising interspersed geometrically-shaped image portions of said live and reference images; and
displaying the composite image.

15. The method of claim 14 in which said geometrically-shaped image portions are polygons.

16. The method of claim 14 in which said images are of the same body surface.

17. A method of facilitating the positioning of a live digital image with respect to a digital reference image, comprising:
obtaining the live digital image;
obtaining and storing the digital reference image;
displaying spaced portions of said digital reference image; and
displaying spaced portions of said live image interspersed between said displayed digital reference image portions to create an intermingled composite display including alternately juxtaposed image portions of said live and reference digital images.

18. The method of claim 17 in which said portions are geometrically-shaped.

19. The method of claim 17 in which said images are of the same body surface.

20. An apparatus for facilitating the positioning of a live image of a body surface with respect to a reference image of the same body surface, comprising:
means for obtaining the live image;
means for obtaining the reference image;
means for intermingling the live and reference images to produce a composite image including means for alternately juxtaposing image portions of said live and reference images in a tesselation; and
means for displaying said composite image.

21. The apparatus of claim 20 in which the reference image includes the same body surface as the live image to facilitate positioning of temporally related images.

22. The apparatus of claim 20 further including means for storing the reference image.

23. The apparatus of claim 20 further including means for digitizing at least one of the images.

24. The apparatus of claim 23 in which said means for intermingling images is stochastic.

25. The apparatus of claim 23 in which said means for intermingling images is deterministic.

26. The apparatus of claim 23 in which said means for intermingling images is linear.

27. The apparatus of claim 23 in which said means for intermingling images is non-linear.

28. The apparatus of claim 23 in which each image is composed of pixels.

29. The apparatus of claim 28 in which said means for combining said images includes means for combining the pixels from said images to produce composite pixels.

30. The apparatus of claim 29 in which each composite pixel is taken from only one of the digital images.

31. The apparatus of claim 20 further including means for displaying the reference image before displaying said composite image.

32. The apparatus of claim 20 in which said tesselation comprises polygonal image areas.

33. An apparatus for facilitating the positioning of a live image with respect to a reference image, comprising:
means for obtaining the live image;
means for obtaining and storing the reference image;
means for alternately selecting geometrically-shaped portions of the two images to produce a composite image comprising interspersed geometrically-shaped image portions of said live and reference images; and
means for displaying said composite image.

34. The apparatus of claim 33 in which said geometrically-shaped image portions are polygons.

35. The apparatus of claim 33 in which said images are of the same body surface.

36. An apparatus for facilitating the positioning of a live digital image with respect to a digital reference image, comprising:
means for obtaining the live digital image;
means for obtaining and storing the digital reference image;
means for displaying spaced portions of said digital reference image; and
means for displaying spaced portions of said live image interspersed between said displayed digital reference image portions to create an intermingled composite display including alternately juxtaposed image portions of said live and stored digital images.

37. The apparatus of claim 36 in which said portions are geometrically-shaped.

38. The apparatus of claim 36 in which said images are of the same body surface.

* * * * *